United States Patent
Sasaki (10) Patent No.: US 8,044,555 B2
(45) Date of Patent: Oct. 25, 2011

(54) DRIVING APPARATUS

(75) Inventor: Ryota Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 359 days.

(21) Appl. No.: 12/163,662

(22) Filed: Jun. 27, 2008

(65) Prior Publication Data

US 2009/0021118 A1    Jan. 22, 2009

(30) Foreign Application Priority Data

Jul. 17, 2007    (JP) .............................. P2007-186147
Jul. 17, 2007    (JP) .............................. P2007-186155

(51) Int. Cl.
*H01L 41/047* (2006.01)

(52) U.S. Cl. .............. 310/329; 310/323.02; 310/323.09; 310/323.17

(58) Field of Classification Search .................. 310/323, 310/323.02, 323.09, 323.17, 328, 329
See application file for complete search history.

(56) References Cited

U.S. PATENT DOCUMENTS

| | | | |
|---|---|---|---|
| 5,109,254 A * | 4/1992 | Oka et al. ...................... | 399/257 |
| 5,994,819 A | 11/1999 | Okamoto et al. | |
| 6,528,926 B2 * | 3/2003 | Okamoto et al. ........ | 310/323.17 |
| 7,315,108 B2 | 1/2008 | Okamoto et al. | |
| 7,365,914 B2 | 4/2008 | Sasaki et al. | |
| 2006/0061236 A1 * | 3/2006 | Naka et al. ..................... | 310/328 |
| 2006/0238074 A1 | 10/2006 | Manabe | |
| 2007/0035210 A1 * | 2/2007 | Sasaki ............................ | 310/329 |
| 2007/0132341 A1 * | 6/2007 | Tokumiya ..................... | 310/328 |
| 2007/0257989 A1 * | 11/2007 | Shirono ................... | 348/208.99 |

FOREIGN PATENT DOCUMENTS

| | | |
|---|---|---|
| JP | 10-337055 A | 12/1998 |
| JP | 2002-142470 A | 5/2002 |
| JP | 2004-242448 | 8/2004 |
| JP | 2006-91210 A | 4/2006 |
| JP | 2006-311794 A | 11/2006 |
| JP | 2007-49873 A | 2/2007 |
| JP | 2007-74889 A | 3/2007 |

OTHER PUBLICATIONS

Office Action, State Intellectual Property Office of People's Republic of China, Jun. 28, 2010.

* cited by examiner

*Primary Examiner* — Walter Benson
*Assistant Examiner* — Bryan Gordon
(74) *Attorney, Agent, or Firm* — Birch, Stewart, Kolasch & Birch, LLP (57) ABSTRACT

A driving apparatus comprises: an electromechanical conversion element that expands and contracts in an extending direction of a given fiducial line; a driving shaft mounted on one end of the electromechanical conversion element in the extending direction; a driven member frictionally engaged with the driving shaft; a holder that supports the electromechanical conversion element from lateral sides with respect to extending direction; and an urging member that urges the electromechanical conversion element in the extending direction.

2 Claims, 8 Drawing Sheets

DRIVING APPARATUS

BACKGROUND OF THE INVENTION

1. Field of the Invention

The present invention relates to a driving apparatus suited for driving a lens or the like in a mobile telephone with a camera, a small-sized digital camera or the like.

2. Description of the Related Art

A driving apparatus, as known in the aforementioned technical field of the related art (as referred to JP-A-2006-91210, for example), comprises: an electromechanical conversion element for expanding and contracting in the extending direction of a given fiducial line; a driving shaft arranged on one end side of the electromechanical conversion element in the extending direction of the given fiducial line; a driven member frictionally engaged with the driving shaft; and a holder supporting the electromechanical conversion element and the driving shaft and urging the other end of the electromechanical conversion element and one end of the driving shaft so that the electromechanical conversion element and the driving shaft may come into abutment. There is also known a driving apparatus (as referred to JP-A-2007-49873, for example), which adopts a constitution for pushing the electromechanical conversion element from the other end side.

Moreover, a driving apparatus, as known in the aforementioned technical field of the related art (as referred to JP-A-2002-142470, JP-A-10-337055, and JP-A-2006-311794, for example), comprises: an electromechanical conversion element for expanding and contracting in the extending direction of a given fiducial line; a driving shaft mounted on one end of the electromechanical conversion element in the extending direction of the given fiducial line; a driven member frictionally engaged with the driving shaft; and a holder supporting the electromechanical conversion element and having a bearing hole of the driving shaft.

In these driving apparatus, driving pulses having saw-tooth waveforms are applied to the electromechanical conversion element so that the electromechanical conversion element is deformed in the state where an expanding rate and a contracting rate are different. When the electromechanical conversion element is deformed at a low rate, moreover, the driven member is caused by the friction to stand still with respect to the driving shaft. When the electromechanical conversion element is deformed at a high rate, on the contrary, the driven member is caused by the inertia to move with respect to the driving shaft. By applying the driving pulses having the saw-tooth waveforms repeatedly to the electromechanical conversion element, therefore, the driven member can be intermittently moved at a fine pitch.

In the driving apparatus thus far described, however, the other end of the electromechanical conversion element and the one end of the driving shaft are so urged by the holder that the electromechanical conversion element and the driving shaft may come into abutment. As a result, the electromechanical conversion element is improved in its supporting stability, but finds it difficult to make its expansion and contraction larger. On the other hand, a technique (as referred to JP-A-2007-74889, for example) for supporting the electromechanical conversion element elastically in the holder is effective for making the expansion and contraction of the electromechanical conversion element larger.

Here, the driving apparatus adopting the technique for supporting the electromechanical conversion element elastically in the holder is desired to improve the supporting stability of the electromechanical conversion element better. An extremely high optical performance is demanded especially for driving a lens or the like in the mobile telephone with the camera, the small-sized digital camera or the like. Therefore, a dislocation, as caused in the electromechanical conversion element by shocks due to a fall or the like, raises a serious problem even if the dislocation is small.

SUMMARY OF THE INVENTION

Therefore, the invention has been conceived in view of the background thus far described, and has an object to provide a driving apparatus, which can make the expansion and contraction of the electromechanical conversion element larger and which can improve the supporting stability of the electromechanical conversion element better.

In order to achieve the aforementioned object, a first driving apparatus according to the invention comprises: an electromechanical conversion element that expands and contracts in an extending direction of a given fiducial line; a driving shaft mounted on one end of the electromechanical conversion element in the extending direction; a driven member frictionally engaged with the driving shaft; a holder that supports the electromechanical conversion element from lateral sides with respect to extending direction; and an urging member that urges the electromechanical conversion element in the extending direction.

In this first driving apparatus, the electromechanical conversion element is elastically supported by the holder so that the expansion and contraction of the electromechanical conversion element can be made larger. At this time, the electromechanical conversion element is urged in its expanding and contracting direction by the urging member so that the supporting stability of the electromechanical conversion element can be improved better.

In the first driving apparatus according to the invention, it is preferred that the urging member urges the electromechanical conversion element in the extending direction on the other end side of the electromechanical conversion element. In this case, it is unnecessary to mount a weight member or the like on the other end of the piezoelectric element so as to displace the one end of the piezoelectric element more than the other end.

In the first driving apparatus according to the invention, it is preferred that the urging member is a screw so fastened in the holder as to push the other end of the electromechanical conversion element. In this case, the supporting stability of the piezoelectric element and the driving performance of the driving apparatus can be adjusted by the fastening extent of the screw.

In order to achieve the aforementioned object, moreover, a second driving apparatus according to the invention comprises: an electromechanical conversion element that expands and contracts in an extending direction of a given fiducial line; a hollow driving shaft mounted on one end of the electromechanical conversion element in the extending direction; a driven member frictionally engaged with the driving shaft; a holder that supports the electromechanical conversion element and comprises a bearing portion for the driving shaft; a support member, disposed in the bearing portion, that comprises a fixing portion fixed in the holder and a fitted portion fitted from one end side in the driving shaft; and an urging member, arranged between the electromechanical conversion element and the fitted portion in the driving shaft, that urges the electromechanical conversion element in the extending direction.

In this second driving apparatus, the electromechanical conversion element is elastically supported by the holder so that the expansion and contraction of the electromechanical conversion element can be made larger. At this time, the electromechanical conversion element is urged in its expanding and contracting direction by the urging member, which is arranged in the hollow driving shaft between the electromechanical conversion element and the fitted portion of the support member, so that the supporting stability of the electromechanical conversion element can be improved better.

In the second driving apparatus according to the invention, it is preferred that the urging member is a spring arranged in a compressed state between the electromechanical conversion element and the fitted portion in the driving shaft. In this case, the supporting stability of the piezoelectric element and the driving performance of the driving apparatus can be adjusted by changing the spring constant of the spring.

DETAILED DESCRIPTION OF THE INVENTION

Preferred embodiments of the invention are described in detail in the following with reference to the accompanying drawings. Here, the same or corresponding portions in the individual drawings are designated by the common reference numerals, and their repeated descriptions are omitted.

Figure 1A:
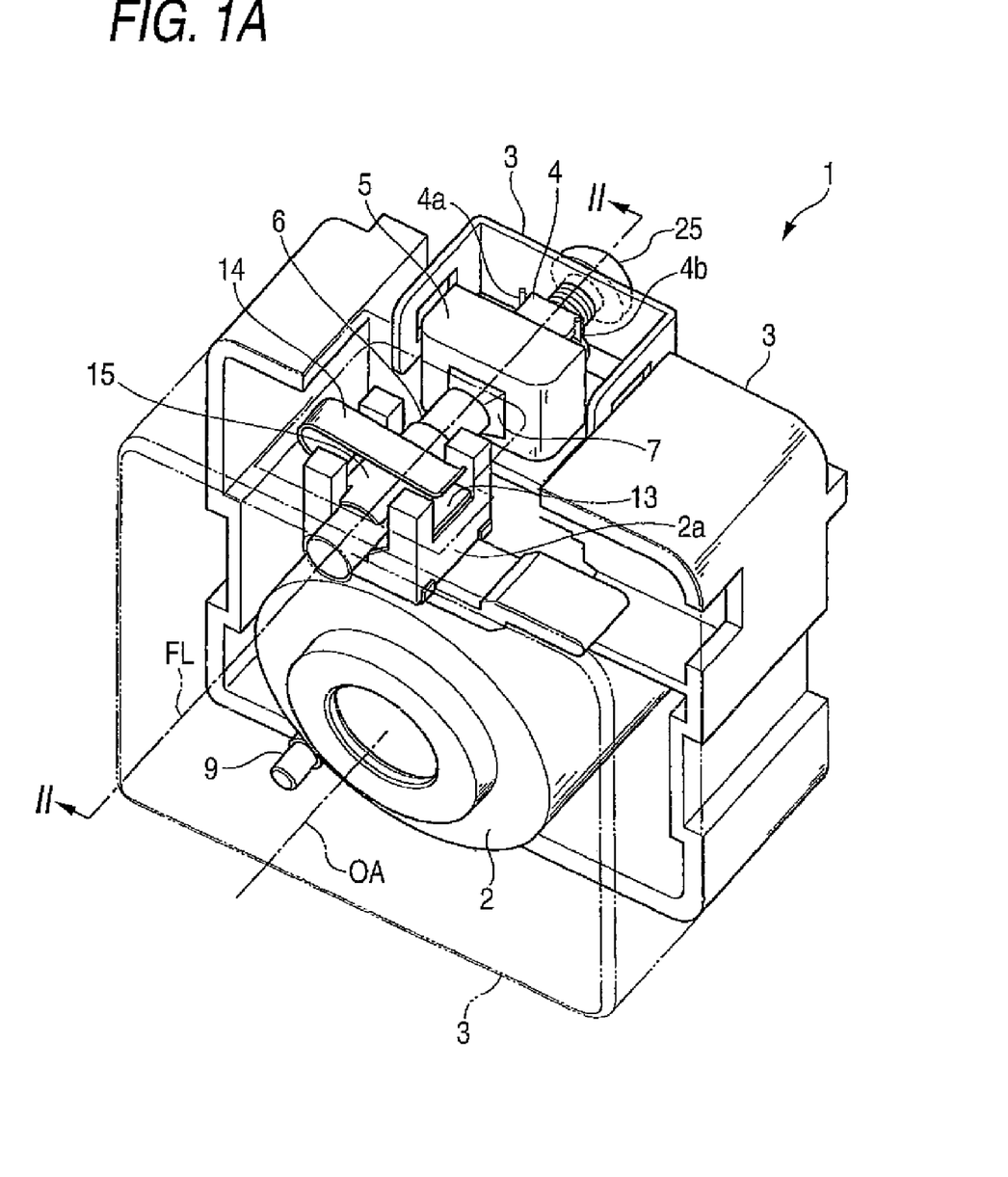
FIG. 1A is a perspective view showing a first embodiment of a driving apparatus according to the invention.
Figure 1B:
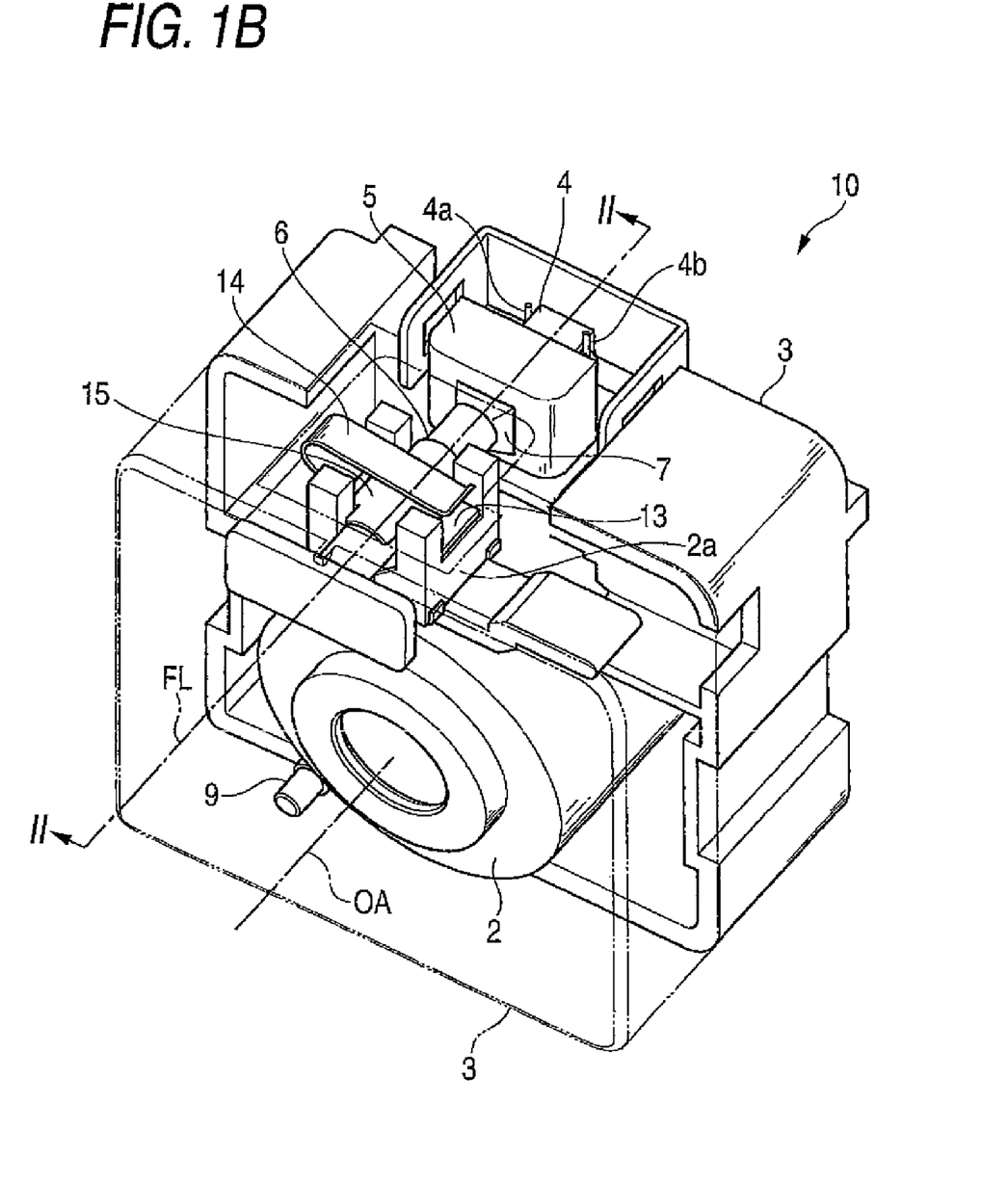
FIG. 1B is a perspective view showing a second embodiment of the driving apparatus according to the invention.
Figure 2A:
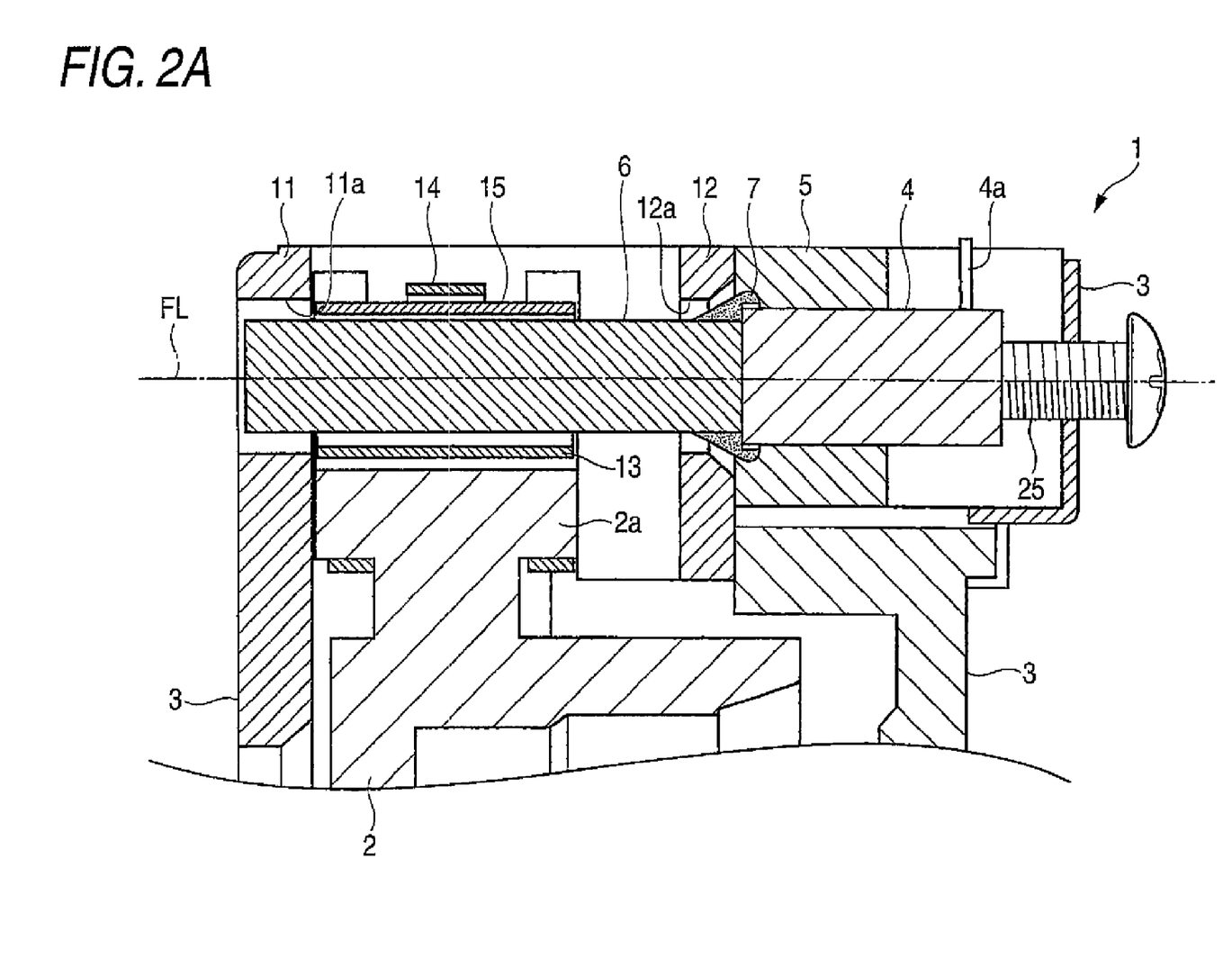
FIG. 2A is a sectional view of a portion shown in FIG. 1A and taken along line II-II.
Figure 2B:
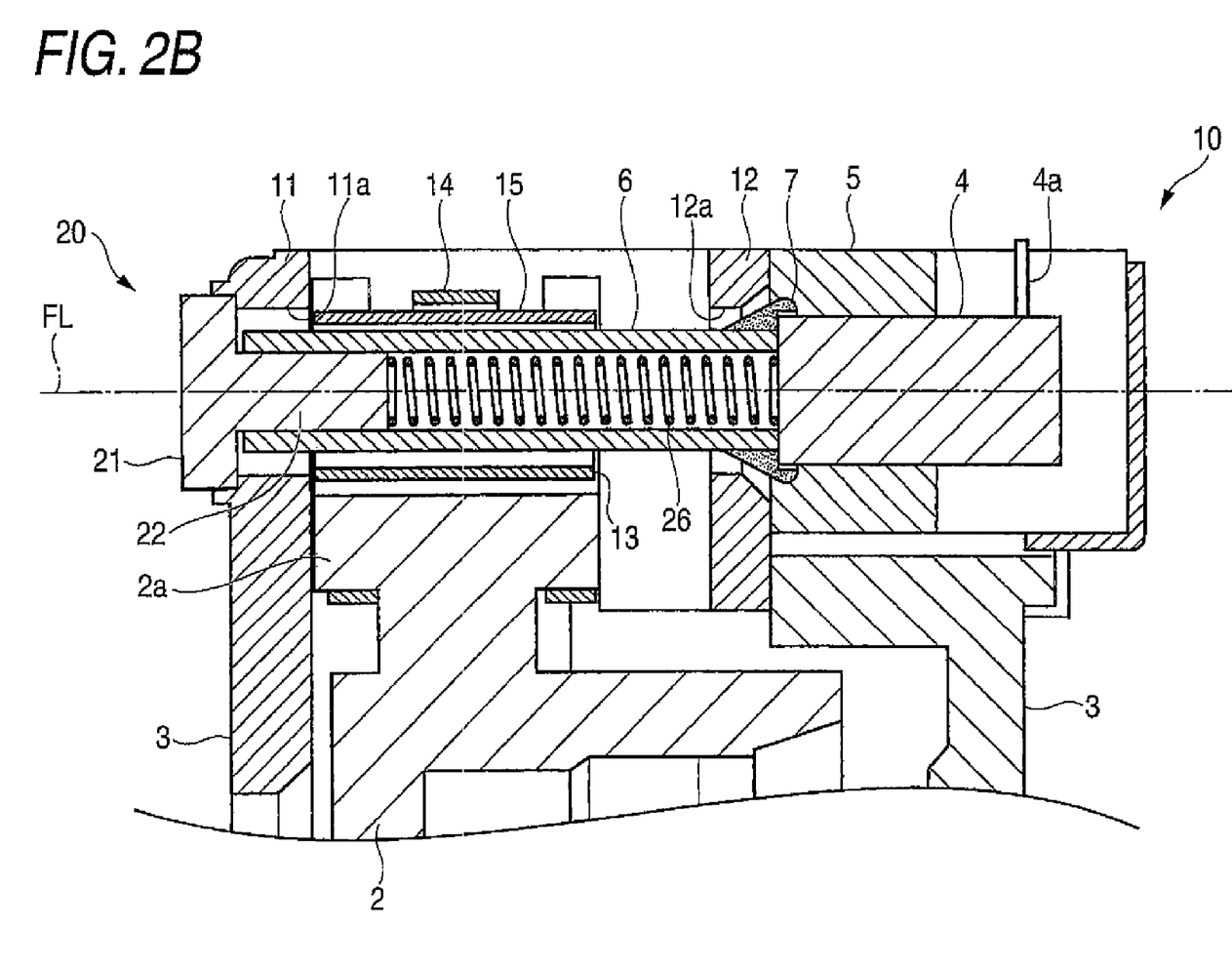
FIG. 2B is a sectional view of a portion shown in FIG. 1B and taken along line II-II.

FIG. 1A is a perspective view showing a first embodiment of a driving apparatus according to the invention, and FIG. 2A is a sectional view of a portion shown in FIG. 1A and taken along line II-II. FIG. 1B is a perspective view showing a second embodiment of the driving apparatus according to the invention, and FIG. 2B is a sectional view of a portion shown in FIG. 1B and taken along line II-II. As shown in FIGS. 1A, 1B, 2A and 2B, the driving apparatus 1 of the first embodiment and the driving apparatus 10 of the second embodiment are apparatus for driving a lens held by a lens frame (or a driven member) 2, along an optical axis OA, and finds its preferred application in a mobile telephone with a camera, a small-sized digital camera or the like.

The driving apparatus 1 or 10 is provided with a holder 3 for housing the lens frame 2. The holder 3 supports a piezoelectric element (or an electromechanical conversion element) 4 for expanding and contracting in the extending direction of a fiducial line FL parallel to the optical axis OA. Specifically, the piezoelectric element 4 is so elastically supported by the holder 3 as is held from lateral sides with respect to the extending direction of the fiducial line FL by a silicone cap 5 adhered to the holder 3 by a silicone adhesive. Here, the piezoelectric element 4 is provided with input terminals 4a and 4b for applying driving pulses.

A driving shaft 6 is so fixed by an adhesive 7 to one end of the piezoelectric element 4 in the extending direction of the fiducial line FL as to extend along the fiducial line FL. In the second embodiment, the driving shaft 6 is made hollow. The driving shaft 6 is formed of a graphite composite, in which graphite crystals are firmly combined, such as carbon graphite, into a column shape in the first embodiment and into a cylindrical shape in the second embodiment.

The driving shaft 6 has its one end portion loosely fitted in a bearing hole 11a (or a bearing portion) formed in a partition 11 of the holder 3. On the other hand, the other end portion of the driving shaft 6 is inserted into a through hole 12a formed in a partition 12 of the holder 3. As a result, the driving shaft 6 can reciprocate along the fiducial line FL.

The driving shaft 6 is frictionally engaged by an engaging portion 2a of the lens frame 2, which is regulated in its moving region by and between the partitions 11 and 12. Specifically, a plate member 13 of a V-shaped section fixed on the engaging portion 2a and a plate member 15 of a V-shaped section urged toward the plate member 13 by a leaf spring 14 retained on the engaging portion 2a clamp the driving shaft 6, so that the engaging portion 2a is so mounted on the driving shaft 6 as to establish a given frictional force as it moves. Here, a pin 9, which is arranged in the groove of the U-shaped section of the lens frame 2, is spanned in the extending direction of the fiducial line FL. In short, the driving shaft 6 functions as a guide pin, too, and the pin 9 functions as a rotation stopping pin of the lens frame 2, too.

In the first embodiment, as shown in FIG. 1A and FIG. 2A, the piezoelectric element 4 is provided, on its other side in the extending direction of the fiducial line FL, with a screw (or an urging member) 25, which is so fastened in the holder 3 as to push the other end of the piezoelectric element 4. The screw 25 urges the piezoelectric element 4 toward the one side of the extending direction of the fiducial line FL.

In the second embodiment, as shown in FIG. 1B and FIG. 2B, a support member 20 for supporting the driving shaft 6 is mounted in the bearing hole 11a of the partition 11. This support member 20 is provided with a fixing portion 21 of a rectangular plate shape adhered and fixed to the holder 3, and a fitted portion 22 loosely fitted in the driving shaft 6 from one end side of the same. Between the other end face of the fitted portion 22 and the one end face of the driving shaft 6, there is formed a clearance for keeping those end faces out of contact even when the piezoelectric element 4 extends to its largest stroke. A spring (or an urging member) 26 is arranged in a compressed state in the driving shaft 6 between the one end face of the piezoelectric element 4 and the other end face of the fitted portion 22. The spring 26 urges the piezoelectric element 4 toward the other side of the extending direction of the fiducial line FL. Here, the fixture of the fixing portion 21 on the holder 3 is not limited to the use of the adhesion but may also be made by means of a screw or the like.

In the driving apparatus 1 or 10 thus constituted, the piezoelectric element 4 is elastically supported by the holder 3. Therefore, the expansion and contraction of the piezoelectric element 4 can be made larger than those of the case, in which the other end of the piezoelectric element 4 and the one end of the driving shaft 6 are so urged by the holder 3 that the piezoelectric element 4 and the driving shaft 6 come into abutment. In the first embodiment, moreover, the piezoelectric element 4 is urged toward the one side of the extending direction (or the expanding and contracting direction) of the fiducial line FL by the screw 25. In the second embodiment, on the other hand, the piezoelectric element 4 is urged toward the other side of the extending direction (or the expanding and contracting direction) of the fiducial line FL by the spring 26, which is arranged in the hollow driving shaft 6 between the piezoelectric element 4 and the fitted portion 22 of the support member 20. Therefore, the supporting stability of the piezoelectric element 4 by the holder 3 can be better improved than that of the case, in which a weight member is mounted on the other end of the piezoelectric element 4 with neither the screw 25 nor the spring 26, for example. As a result, the piezoelectric element 4 can be prevented from dislocation, as might otherwise be caused by shocks due to a fall or the like. When the lens or the like is driven in the mobile telephone with the camera, the small-sized digital camera or the like, for example, the drive can keep an extremely high optical performance.

Here, the hardness (or the hardness of the silicone cap 5, for example) at the time when the piezoelectric element 4 is elastically supported by the holder 3 is suitably a durometer A 90 or less and is preferably a durometer A 20 to 60.

In the first embodiment, moreover, the screw 25 urges the piezoelectric element 4 toward the one side of the extending direction of the fiducial line FL. This makes it unnecessary to mount a weight member or the like on the other end of the piezoelectric element 4 so as to displace the one end of the piezoelectric element 4 more than the other end.

Moreover, the supporting stability of the piezoelectric element 4 by the holder 3 and the driving performance of the driving apparatus 1 can be adjusted by the fastening extent of the screw 25.

In the second embodiment, on the other hand, the supporting stability of the piezoelectric element 4 and the driving performance of the driving apparatus 1 or 10 can be adjusted by changing the spring constant of the spring 26.

Figure 3:
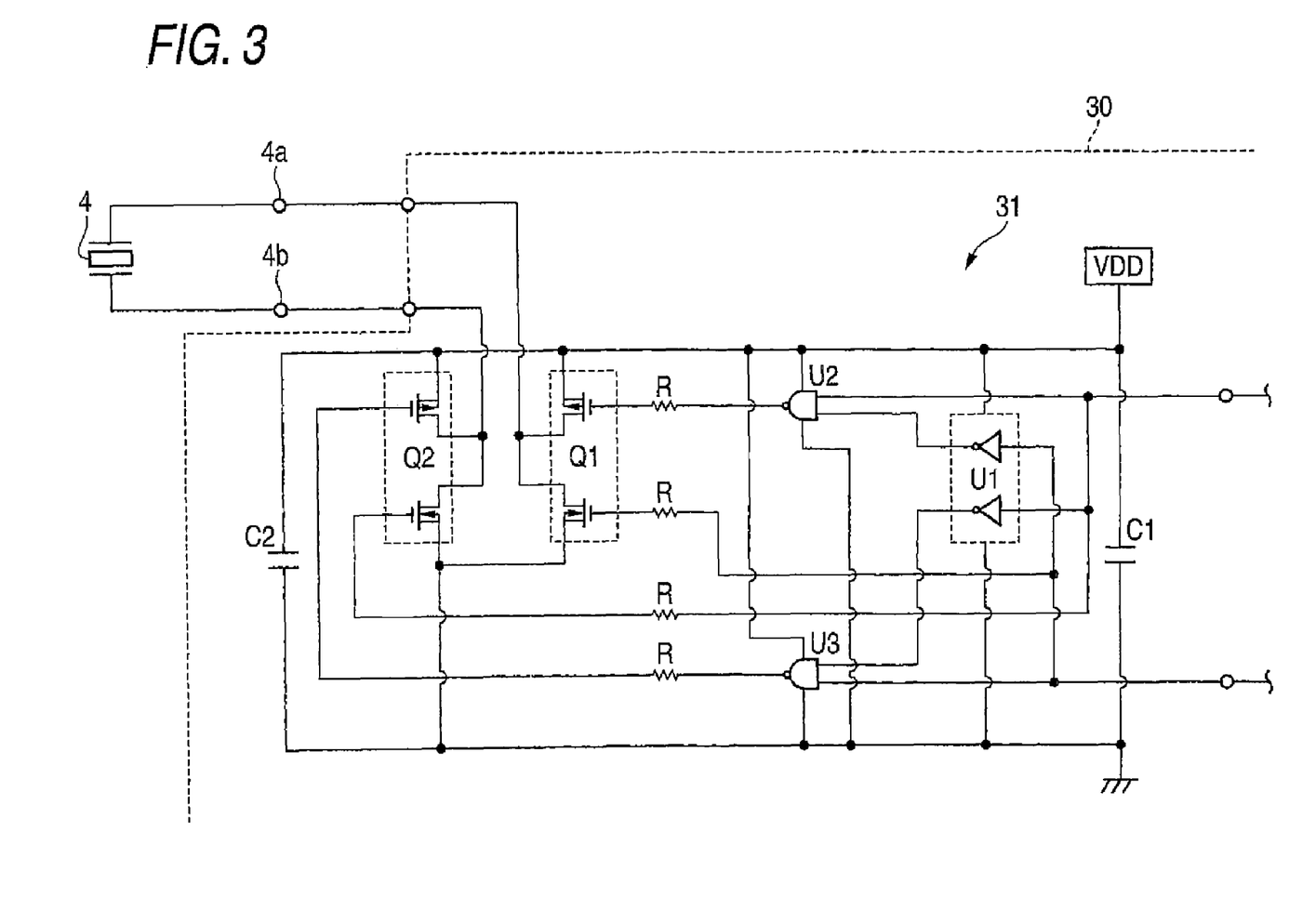
FIG. 3 is a circuit diagram of a driving circuit for activating an piezoelectric element shown in FIG. 1A and FIG. 2A.
Figure 4A:
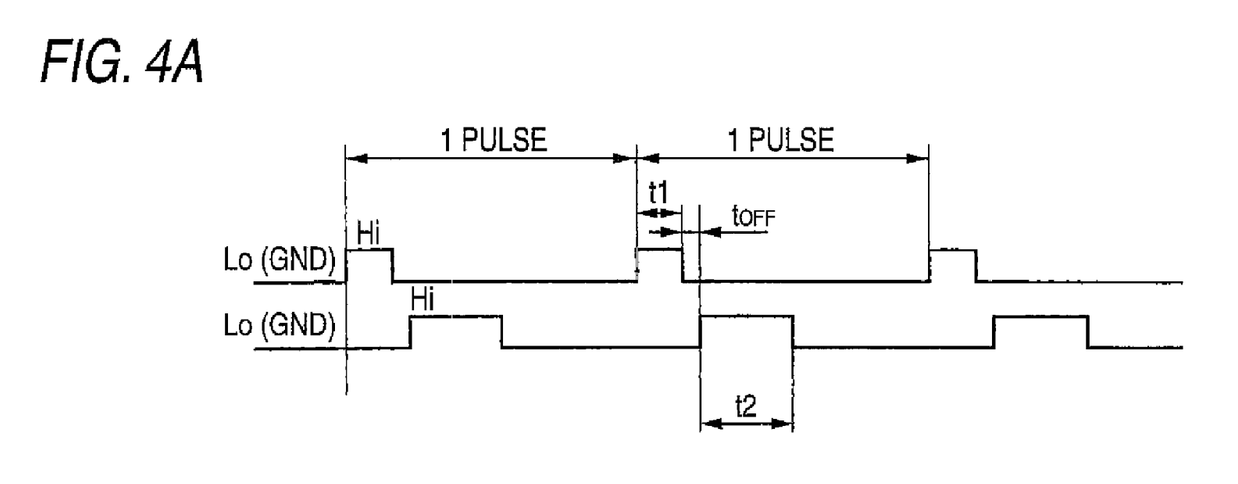
FIGS. 4A and 4B are waveform diagrams of an input signal to be inputted to the driving circuit shown in FIG. 3.
Figure 4B:
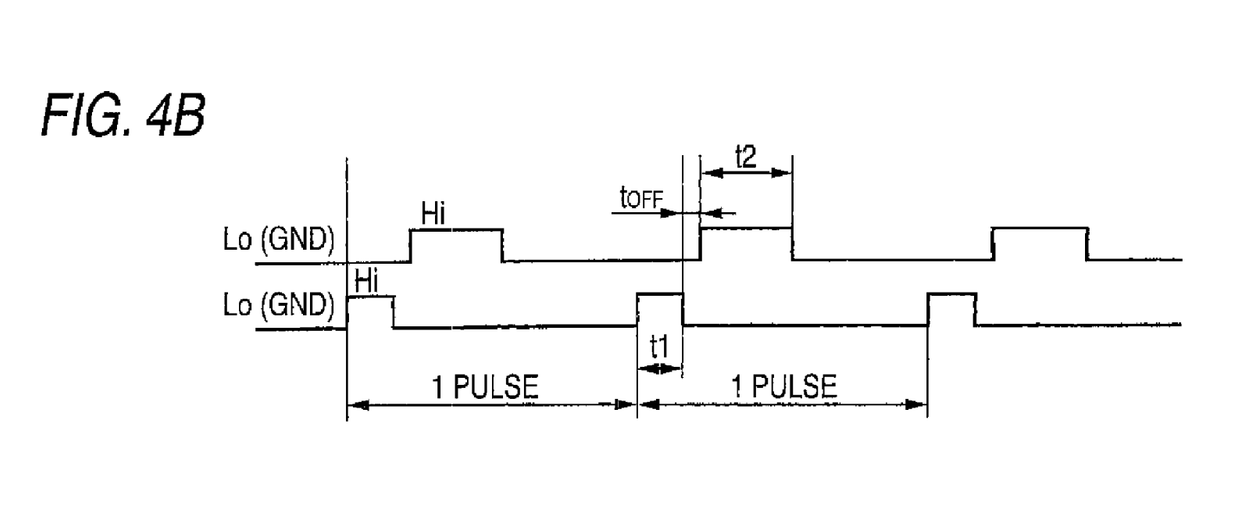
Figure 5A:
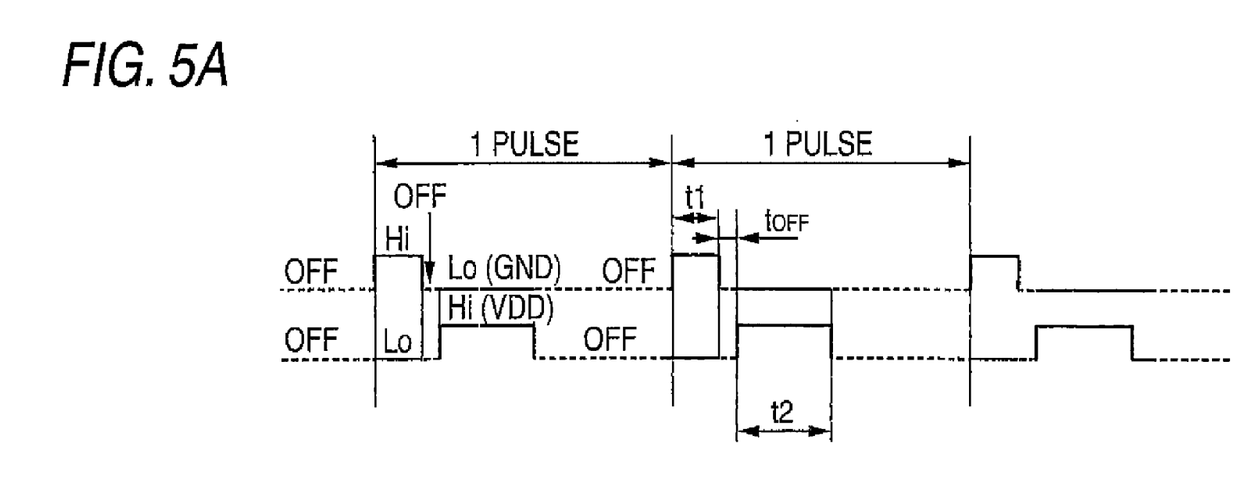
FIGS. 5A and 5B are waveform diagrams of an output signal to be outputted from the driving circuit shown in FIG. 3.
Figure 5B:
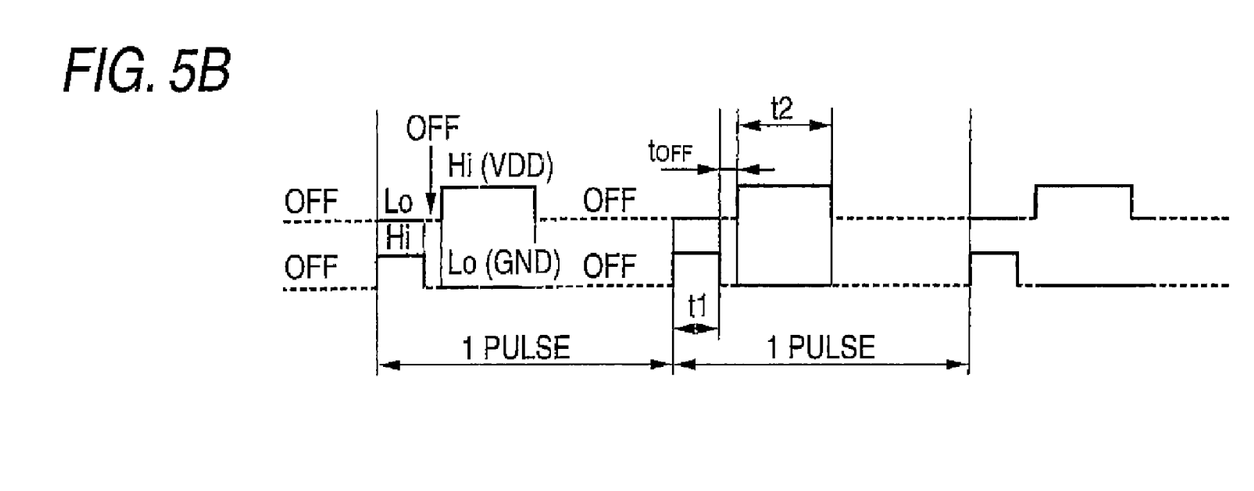

The actions of the driving apparatus 1 or 10 are described hereinafter. FIG. 3 is a circuit diagram of a driving circuit for activating the piezoelectric element shown in FIGS. 1A and 1B. FIGS. 4A and 4B are waveform diagrams of an input signal to be inputted to the driving circuit shown in FIG. 3. FIGS. 5A and 5B are waveform diagrams of an output signal to be outputted from the driving circuit shown in FIG. 3.

As shown in FIG. 3, a driving circuit 31 is disposed in a control unit 30. This control unit 30 performs the entire control of the driving apparatus 1, and includes a CPU, a ROM, a RAM, an input signal circuit and an output signal circuit. The driving circuit 31 functions as a drive circuit for the piezoelectric element 4, and outputs a driving electric signal to the piezoelectric element 4. The driving circuit 31 inputs a control signal from the control signal generating unit of the control unit 30, and amplifies the control signal in voltage or amplitude and outputs an electric signal for driving the piezoelectric element 4. The driving circuit 31 used has its input stage constituted of logic circuits U1 to U3, for example, and its output stage equipped with field effect type transistors (FET) Q1 and Q2. These transistors Q1 and Q2 can output a Hi-output (or a high-potential output), a Lo-output (or a low-potential output) and an OFF-output (or an open output) as their output signals.

FIG. 4A illustrates the input signal, which is inputted when the lens frame 2 is moved so that the engaged portion 2a may approach the piezoelectric element 4, and FIG. 4B illustrates the input signal, which is inputted when the lens frame 2 is moved so that the engaged portion 2a may leave the piezoelectric element 4. On the other hand, FIG. 5A illustrates the output signal, which is outputted when the lens frame 2 is moved so that the engaged portion 2a may approach the piezoelectric element 4, and FIG. 5B illustrates the output signal, which is outputted when the lens frame 2 is moved so that the engaged portion 2a may leave the piezoelectric element 4.

Output signals of FIGS. 5A and 5B are the pulse signals, which are turned ON/OFF at the same timings as those of the input signals of FIGS. 4A and 4B. The two signals of FIGS. 5A and 5B are inputted to the input terminals 4a and 4b of the piezoelectric element 4. Although pulse signals having sawtooth waveforms may be inputted to those input terminals 4a and 4b, the piezoelectric element 4 can be actuated, too, even if it is fed with pulse signals having rectangular waveforms, as shown in FIG. 5. In this case, the driving signals of the piezoelectric element 4 may be pulse signals having the rectangular waveforms so that the signal generations are facilitated.

The output signals of FIGS. 5A and 5B are constituted of two pulse signals of the common frequency. These two pulse signals are changed, by making their phases different each other, into either signals having such a potential difference as becomes stepwise large and abruptly small, or signals having such a potential difference as becomes abruptly large and stepwise small. By inputting these two signals, the expanding rate and the contracting rate of the piezoelectric element 4 can be made different to move the engaged portion 2a and accordingly the lens frame 2.

In FIGS. 5A and 5B, for example, the signals are set such that, after one was changed from Hi (High) to Lo (Low), the other becomes Hi. These signals are set such that the other signal becomes Hi after a given time lag $t_{OFF}$ elapsed when one signal becomes Lo. In case both the two signals are Lo, moreover, the output is turned OFF (or Open).

Signals of frequencies exceeding an audible frequency are used as the output signals of FIGS. 5A and 5B, that is, the electric signals for activating the piezoelectric element 4. In FIGS. 5A and 5B, the two signals are made to have frequencies exceeding the audible frequency, such as 30 to 80 KHz, preferably 40 to 60 KHz. The operating noise in the audible range of the piezoelectric element 4 can be reduced by using the signals of such frequency.

Thus, the driving apparatus 1 or 10 acts in the following manners. Specifically, the electric signals are inputted to the piezoelectric element 4 so that the piezoelectric element 4 is caused to repeat the expansion and contraction by the inputs of the electric signals. In response to these expansion and contraction, the driving shaft 6 reciprocates. By making different the expanding rate and the contracting rate of the piezoelectric element 4, the velocity of the driving shaft 6 to move in one direction and the velocity to move in the other direction become different. As a result, the engaged portion 2a, accordingly the lens frame 2 is moved in the desired direction.

The invention should not be limited to the aforementioned embodiments.

Figure 6:
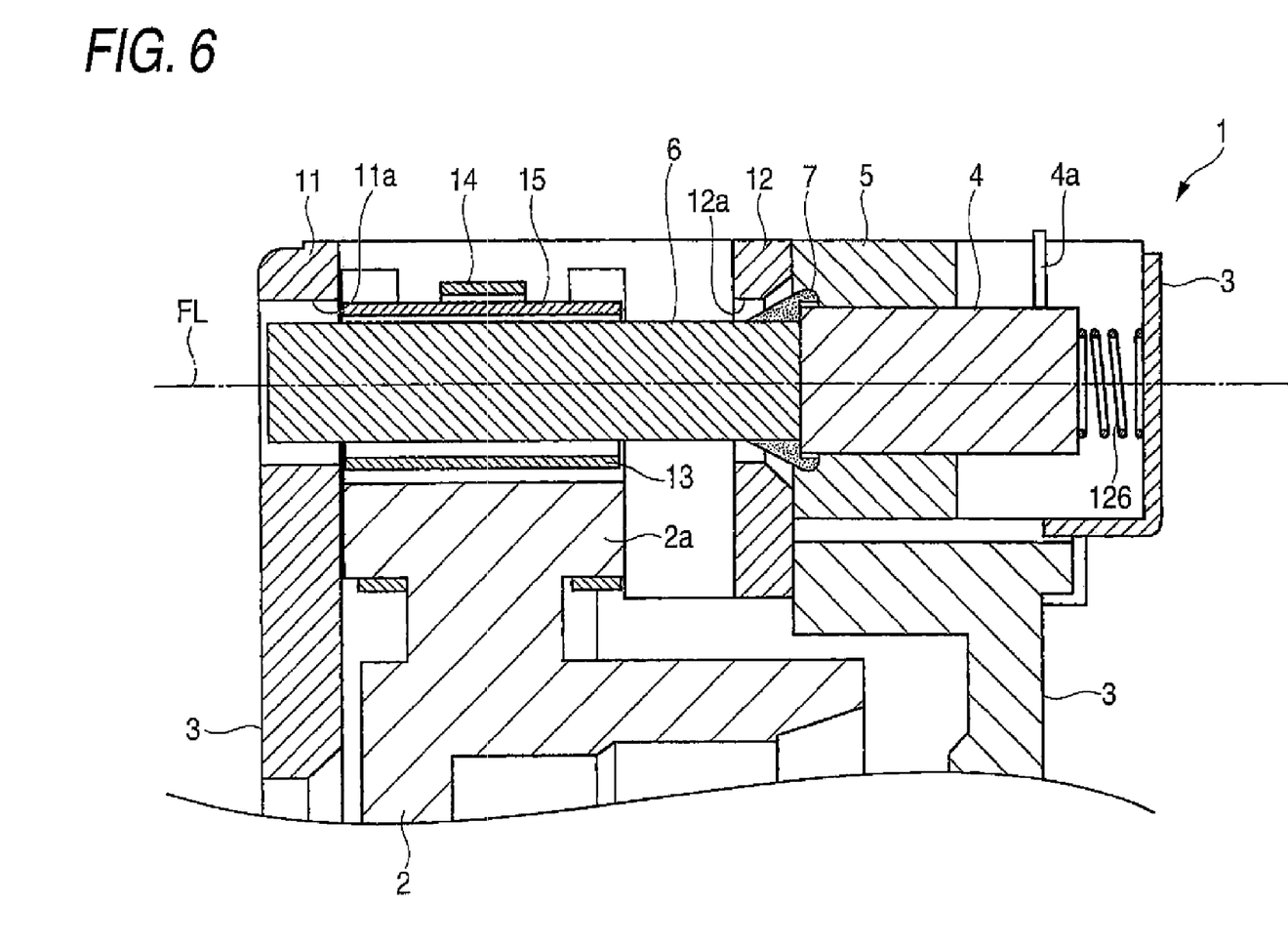
FIG. 6 is a sectional view of a portion showing another embodiment of the driving apparatus according to the invention.

In the first embodiment, for example, an elastic member (or an urging member) 126 of a spring or rubber may also be arranged in a compressed state between the other end of the piezoelectric element 4 and the holder 3, as shown in FIG. 6. In this case, too, the piezoelectric element 4 is urged toward the one side of the extending direction of the fiducial line FL by the elastic member 126. Therefore, the supporting stability of the piezoelectric element 4 by the holder 3 can be better improved than that of the case, in which the elastic member 126 is not provided but a weight member is mounted on the other end of the piezoelectric element 4, for example.

In the aforementioned first embodiment, on the other hand, the piezoelectric element 4 is urged toward the one side of the extending direction of the fiducial line FL, but the urging mode is not limited thereto. By mounting a tension spring or the like between the other end of the piezoelectric element 4 and the holder 3, for example, the piezoelectric element 4 may also be urged toward the other side of the extending direction of the fiducial line FL.

Moreover, the piezoelectric element 4 may also be urged in the extending direction of the fiducial line FL not by pushing or pulling the other end of the piezoelectric element 4 directly but by pushing or pulling the other end of the piezoelectric element 4 indirectly through some member.

In the second embodiment, on the other hand, an elastic member of rubber or the like may be arranged in a compressed state in the driving shaft 6, for example, between the one end face of the piezoelectric element 4 and the other end face of the fitted portion 22. In this case, too, the piezoelectric element 4 is urged toward the other side of the extending direction of the fiducial line FL by the elastic member. Therefore, the supporting stability of the piezoelectric element 4 by the holder 3 can be better improved than that of the case, in which the elastic member is not provided but a weight member is mounted on the other end of the piezoelectric element 4, for example.

In the aforementioned second embodiment, on the other hand, the piezoelectric element 4 is urged toward the other side of the extending direction of the fiducial line FL, but the urging mode is not limited thereto. By mounting a tension spring or the like in the driving shaft 6 between the one end face of the piezoelectric element 4 and the other end face of the fitted portion 22, for example, the piezoelectric element 4 may also be urged toward the one side of the extending direction of the fiducial line FL.

In the driving shaft 6, moreover, the piezoelectric element 4 may also be urged in the extending direction of the fiducial line FL not by pushing or pulling the one end face of the piezoelectric element 4 or the other end of the fitted portion 22 directly but by pushing or pulling the one end face of the piezoelectric element 4 or the other end face of the fitted portion indirectly through a member.

On the other hand, the support of the piezoelectric element 4 by the holder 3 should not be limited to the lateral sides one with respect to the extending direction of the fiducial line FL, but may also be made from the other side of the extending direction of the fiducial line FL, if the support is elastic.

According to the invention, it is possible to make the expansion and contraction of the electromechanical conversion element larger and to improve the supporting stability of the electromechanical conversion element better.

The entire disclosure of each and every foreign patent application from which the benefit of foreign priority has been claimed in the present application is incorporated herein by reference, as if fully set forth.

What is claimed is:

1. A driving apparatus comprising:
    an electromechanical conversion element that expands and contracts in an extending direction of a given fiducial line;
    a hollow driving shaft mounted on one end of the electromechanical conversion element in the extending direction;
    a driven member frictionally engaged with the driving shaft;
    a holder that supports the electromechanical conversion element and comprises a bearing portion for the driving shaft;
    a support member, disposed in the bearing portion, that comprises a fixing portion fixed in the holder and a fitted portion fitted from one end side in the driving shaft; and
    an urging member, arranged between the electromechanical conversion element and the fitted portion in the driving shaft, that urges the electromechanical conversion element in the extending direction.

2. A driving apparatus of claim 1, wherein the urging member is a spring arranged in a compressed state between the electromechanical conversion element and the fitted portion in the driving shaft.

* * * * *